(12) United States Patent
Wang

(10) Patent No.: US 12,009,727 B2
(45) Date of Patent: Jun. 11, 2024

(54) MAGLEV GENERATOR ASSEMBLY WHICH REDUCES FRICTION TO ENHANCE POWER GENERATION EFFICIENCY

(71) Applicant: Meng-Theng Wang, New Taipei (TW)

(72) Inventor: Meng-Theng Wang, New Taipei (TW)

( * ) Notice: Subject to any disclaimer, the term of this patent is extended or adjusted under 35 U.S.C. 154(b) by 0 days.

(21) Appl. No.: 17/872,004

(22) Filed: Jul. 25, 2022

(65) Prior Publication Data

US 2024/0030779 A1    Jan. 25, 2024

(51) Int. Cl.
*H02K 7/09* (2006.01)
*F03D 9/25* (2016.01)
*H02K 7/116* (2006.01)
*H02K 7/18* (2006.01)

(52) U.S. Cl.
CPC ............... *H02K 7/09* (2013.01); *F03D 9/25* (2016.05); *H02K 7/116* (2013.01); *H02K 7/183* (2013.01); *F05B 2220/706* (2013.01)

(58) Field of Classification Search
CPC . F03D 9/25; H02K 7/09; H02K 7/116; H02K 7/183; F05B 2220/706; F05B 2240/51; F05B 2240/511; F05B 2240/515; F04D 29/058; F04D 29/051; F04D 29/0513
USPC ...................................................... 290/44, 55
See application file for complete search history.

(56) References Cited

U.S. PATENT DOCUMENTS

| | | | | |
|---|---|---|---|---|
| 5,495,221 A * | 2/1996 | Post | ............ | H01F 7/0242 310/90.5 |
| 6,750,588 B1 * | 6/2004 | Gabrys | ............ | H02K 19/06 310/268 |
| 6,831,374 B2 * | 12/2004 | Seki | ............ | F03D 80/70 290/55 |
| 7,417,334 B2 * | 8/2008 | Uchiyama | ............ | H02K 7/14 290/55 |
| 7,462,950 B2 * | 12/2008 | Hu | ............ | F16C 39/066 290/55 |
| 7,944,069 B2 * | 5/2011 | Uchiyama | ............ | F03D 9/11 290/55 |
| 8,487,470 B2 * | 7/2013 | Grassman | ............ | F03D 9/25 290/55 |
| 9,225,222 B2 * | 12/2015 | Hashish | ............ | F16C 39/066 |
| 10,424,993 B2 * | 9/2019 | Wong | ............ | H02K 47/00 |
| 11,454,210 B2 * | 9/2022 | Chang | ............ | F03D 3/064 |
| 2008/0174119 A1 * | 7/2008 | Hu | ............ | F16C 39/066 290/55 |

(Continued)

*Primary Examiner* — Tulsidas C Patel
*Assistant Examiner* — S. Mikailoff
(74) *Attorney, Agent, or Firm* — Leong C. Lei

(57) ABSTRACT

A maglev generator assembly has a main axle extending through a casing. The main axle has its two ends magnetically levitated by maglev supports, and has its lateral side magnetically levitated by maglev bearings. A generator is configured on the main axle, which includes at least a rotating disc as rotor, with multiple inductive magnets circularly arranged around the rotating disc, and a number of coils fixed around the main axle as stator. A top end of the main axle is coupled to a transmission mechanism, which in turn is coupled to a fan unit or a motor as power source. The fan unit or motor drives the main axle, as well as the rotating disc to spin, and electrical current is induced as the inductive magnets rotates relative to the coils. The main axle is fully magnetically levitated and its rotation undergoes minimum friction to achieve high efficiency.

4 Claims, 3 Drawing Sheets

(56) References Cited

U.S. PATENT DOCUMENTS

| | | | |
|---|---|---|---|
| 2010/0295316 A1* | 11/2010 | Grassman | H02K 7/183 |
| | | | 290/55 |
| 2011/0031756 A1* | 2/2011 | Gabrys | F03D 80/70 |
| | | | 290/55 |
| 2016/0049832 A1* | 2/2016 | Hill | F03D 3/062 |
| | | | 74/DIG. 9 |
| 2018/0351446 A1* | 12/2018 | Wong | H02K 3/46 |

* cited by examiner

MAGLEV GENERATOR ASSEMBLY WHICH REDUCES FRICTION TO ENHANCE POWER GENERATION EFFICIENCY

BACKGROUND OF THE INVENTION

(a) Technical Field of the Invention

The present invention is generally related to generators, and more particular to a magnetic levitation generator assembly.

(b) Description of the Prior Art

R.O.C. Taiwan Patent No. M561728 teaches a maglev generator where an axle is extended vertically out of a hollow casing. Inside the casing, stators which include a number of second magnets are arranged circularly around the axle. A cone-shaped bottom end of the axle touches a bottom wall of the casing. A third magnet is configured to a top end of the axle. Configured along the axle, there are a fan, a generator, and a number of magnetic rotors. The rotors include first magnets having a same or reverse polarity to that of the second magnets, and positioned oppositely to the second magnets. By the repulsion or attraction between the first magnets and the second magnets, the axle is maintained in an upright state. A fourth magnet is positioned above the top end of the axle. The fourth magnet and the third magnet have different polarities and their mutual attraction cancels the weight of the axle so that the axle may spin with reduced resistance.

SUMMARY OF THE INVENTION

The objective of the present invention is to enhance power generation efficiency by reducing the friction when a generator assembly operates. The generator assembly is applicable as a wind turbine generator, or may be driven by a small-power motor.

The generator assembly includes a hollow casing, a lower maglev support on a bottom inner wall of the casing, an upper maglev support on a top inner wall of the casing, a number of maglev bearings positioned inside the casing vertically and sequentially above the lower maglev support, a main axle running vertically through the maglev bearings, where a bottom end of the main axle is joined to the lower maglev support and a top end of the main axle extends outside the casing through the upper maglev support, a generator including a number of coils as stator and at least one rotating disc as rotor, where the coils are fixedly surrounding the main axle and connected to a power transmission cable, the at least one rotating disc is fixed to the main axle, and a number of inductive magnets are arranged on a side and along with a circumference of the at least one rotating disc opposite to the coils, and a fan unit outside the casing coupled to the main axle. When the fan unit spins, the main axle is driven to spin as well, the at least one rotating disc of the generator rotates relative to the coils, and electrical current is induced on the coils and output from the transmission cable. As described, the main axle is fully magnetically levitated and, compared to prior arts, its rotation undergoes minimum friction to achieve high power generation efficiency.

Preferably, the lower maglev support includes a circular lower rotating disc and a circular lower fixed disc. The lower rotating disc includes a number of first magnets. The lower fixed disc includes a number second magnets. The first magnets are arranged on a bottom side and around a center of the lower rotating disc. A center of a top side of the lower rotating disc is fixed to a bottom end of the main axle. The second magnets are arranged on a top side and around a center of the lower fixed disc. The lower fixed disc is fixed to the bottom inner wall of the casing adjacent and opposite to the lower rotating disc. The upper maglev support includes a circular upper fixed disc and a circular upper rotating disc. The upper fixed disc includes a number of third magnets and the upper rotating disc includes a number of fourth magnets. The third magnets are arranged on a bottom side and around a center of the upper fixed disc. The fourth magnets are arranged on a top side and around a center of the upper rotating disc. A top side of the upper fixed disc is fixed to the top inner wall of the casing. The upper rotating disc is fixed to an upper section of the main axle adjacent and opposite to the upper fixed disc. The first magnets and the second magnets are of a same magnetic polarity, and the third magnets and the fourth magnets are of a same magnetic polarity. Due to repulsion between the first and second magnets, and between the third and fourth magnets, the upper rotating and fixed discs do not contact each other and the lower rotating and fixed discs do not contact each other. As such, the maglev supports magnetically levitate the main axle's weight along the vertical direction.

In one embodiment, the fan unit includes an axle, a number of blades fanned out from the axle, an active bevel gear fixed to a back end of the axle, and a passive bevel gear fixed to the top end of the main axle coupled to the active bevel gear. When the blades spin, the active bevel gear and the passive bevel gear together drive the main axle to rotate and the generator produces electricity.

In another embodiment, the fan unit is replaced by a small-power motor, where the main axle is directly driven by the motor to spin.

As described, the main axle of the present invention is fully magnetically levitated and its rotation undergoes minimum friction to achieve greater speed. Therefore, an enhanced power generation efficiency is attained.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
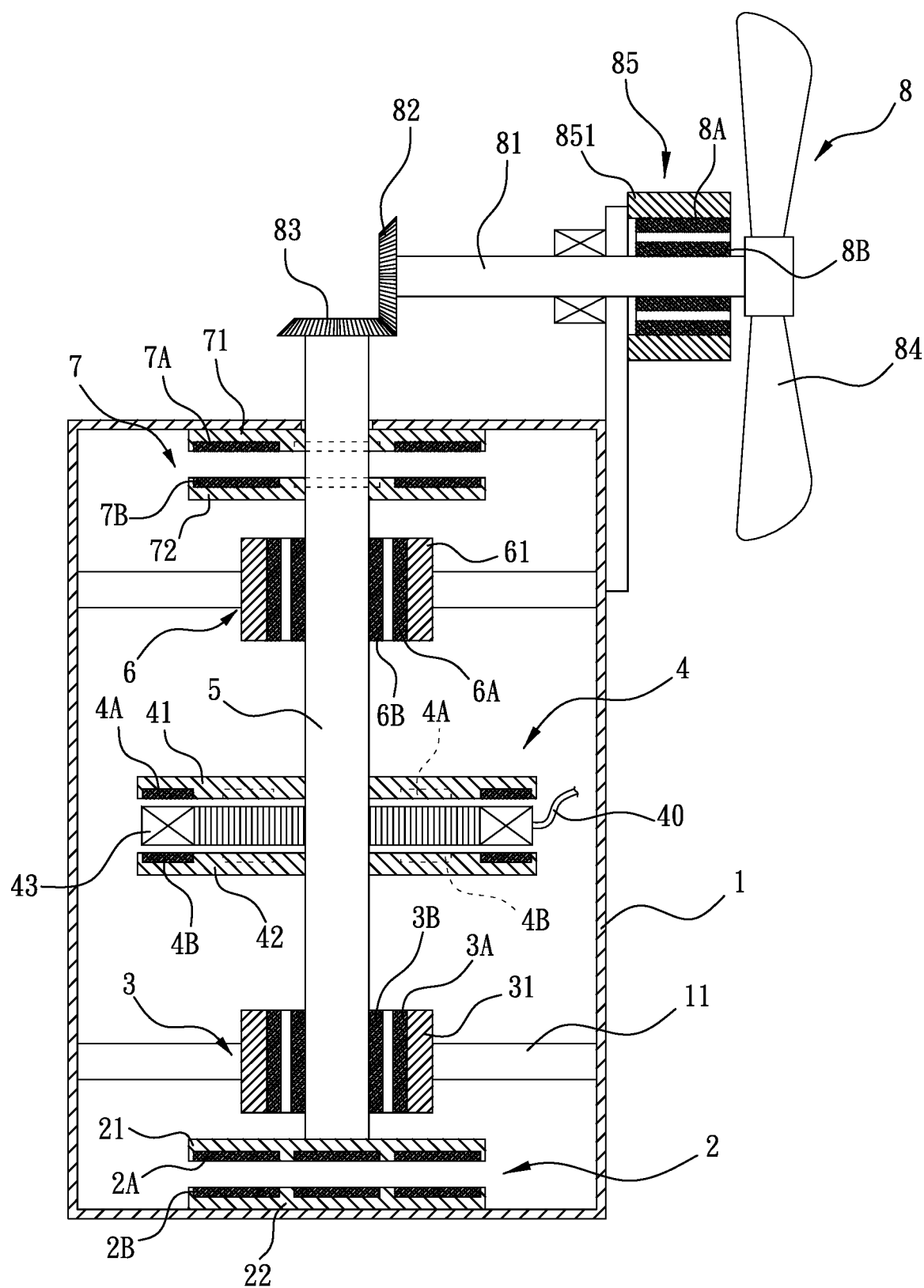
FIG. 1 is schematic sectional diagram showing a maglev generator assembly according to a first embodiment of the present invention.
Figure 2:
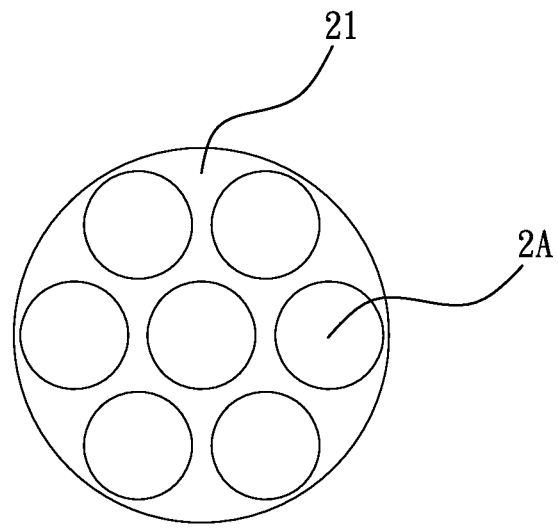
FIG. 2 is a bottom view diagram showing the arrangement of first magnets on a rotating disc of the maglev generator assembly of FIG. 1.
Figure 3:
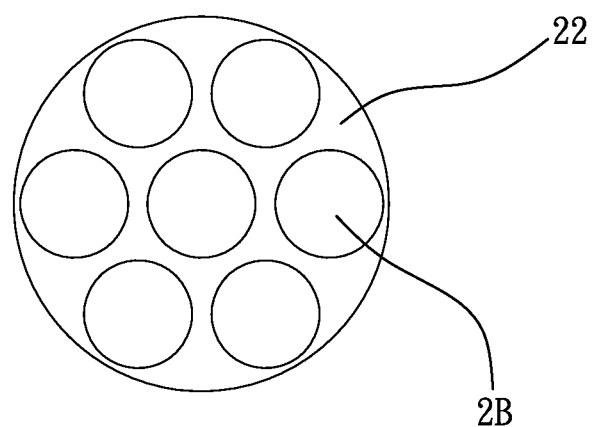
FIG. 3 is a top view diagram showing the arrangement of second magnets on a fixed disc of the maglev generator assembly of FIG. 1.

As shown in FIG. 1, a magnetic levitation (maglev) generator assembly according to a first embodiment of the present invention, which is applicable as a wind turbine generator, includes a hollow casing 1 where, inside the casing 1, an upper maglev support 7 and a lower maglev support 2 are respectively configured on a top inner wall and a bottom inner wall of the casing 1. A first maglev bearing 3 and a second maglev bearing 6, both structurally identical, are fixedly and vertically arranged inside the casing 1 and positioned between the upper maglev support 7 and the lower maglev support 2. The first maglev bearing 3 is closer to the lower maglev support 2 and the second maglev bearing 6 is closer to the upper maglev support 7. The lower maglev support 2 includes a lower rotating disc 21 and a lower fixed disc 22. The lower rotating disc 21 includes a number of first magnets 2A and the lower fixed disc includes a number second magnets 2B. As shown in FIG. 2, the first magnets 2A are arranged on a bottom side and around a center of the circular lower rotating disc 21. A center of a top side of the lower rotating disc 21 is fixed to a bottom end of a main axle 5. As shown in FIG. 3, the second magnets 2B are arranged on a top side and around a center of the circular lower fixed disc 22. The first magnets 2A and the second magnets 2B are of a same magnetic polarity. The lower fixed disc 22 is fixed to the bottom inner wall of the casing 1 adjacent and opposite to the lower rotating disc 21. The upper maglev support 7 includes an upper fixed disc 71 and an upper rotating disc 72. The upper fixed disc 71 includes a number of third magnets 7A and the upper rotating disc 72 includes a number of fourth magnets 7B. The third magnets 7A are arranged on a bottom side and around a center of the circular upper fixed disc 71. The fourth magnets 7B are arranged on a top side and around a center of the circular upper rotating disc 72. A top side of the upper fixed disc 71 is fixed to the top inner wall of the casing 1. The third magnets 7A and the fourth magnets 7B are of a same magnetic polarity. The upper rotating disc 72 is fixed to an upper section of the main axle 5 adjacent and opposite to the upper fixed disc 71.

The first maglev bearing 3 includes a first stator 31 and a first rotor (not numbered) and is positioned above the lower rotating disc 21 on a lower section of the main axle 5. The first stator 31 has a cylindrical body, and a number of fifth magnets 3A are arranged along its inner circumference. The first stator 31 is fixed to the casing 1 by, for example, a rack 11. The first rotor includes a number sixth magnets 3B arranged around an outer circumference of the main axle 5 and surrounded by the fifth magnets 3A. The fifth magnets 3A and the sixth magnets 3B are of a same magnetic polarity. The repulsion between the fifth magnets 3A and the sixth magnets 3B laterally supports the main axle 5. Similarly, the second maglev bearing 6 includes a second stator 61 and a second rotor (not numbered) and is positioned beneath the upper rotating disc 72 to an upper section of the main axle 5. The second stator 61 has a cylindrical body, and a number of seventh magnets 6A are arranged along its inner circumference. The second stator 61 is fixed to the casing 1 by, for example, a rack (not numbered). The second rotor includes a number eighth magnets 6B arranged around an outer circumference of the main axle 5 and surrounded by the seventh magnets 6A. The seventh magnets 6A and the eighth magnets 6B are of a same magnetic polarity. The repulsion between the seventh magnets 6A and the eighth magnets 6B laterally supports the main axle 5. Therefore, the main axle 5 is and maintains vertically erected respectively by the second maglev bearing 6 and the first maglev bearing 3.

A generator 4 is configured on the main axle 5 between the first maglev bearing 3 and the second maglev bearing 6. The generator 4 preferably includes a number of coils 43 as stator and two rotating discs as rotor. The coils 43 are fixedly positioned inside the casing 1 around the main axle 5 and are connected to a power transmission cable 40. The coils 43 are vertically positioned between the two rotating discs, a first rotating disc 41 and a second rotating disc 42, both fixedly joined to the main axle 5. The first rotating disc 41 has a number of inductive magnets 4A on a bottom side along its circumference, and the second rotating disc 42 has a number of second inductive magnets 4B on a top side along its circumference. When the first rotating disc 41 and the second rotating disc 42 spins along with the main axle 5, the first inductive magnets 4A and the second inductive magnets 4B rotate relatively to the coils 43, and inductive current is as such generated and output from the power transmission cable 40. The generator 4 in alternative embodiments may also include a single rotating disc, where a smaller current would be produced. In addition, in alternative embodiments, there may be more generators 4 as required to produce greater current.

A top end of the main axle 5 is extended out of the casing 1 and is coupled to a fan unit 8 positioned outside and above the casing 1. The fan unit 8 is the power source to the generator 4.

The fan unit 8 includes blades 84 fanned out from an axle 81. The axle 81 is mounted to the casing 1 through a third maglev bearing 85. An active bevel gear 82 is fixed to a back end of the axle 81, which is coupled to a passive bevel gear 83 which is fixed to the top end of the main axle 5. The third maglev bearing 85 is structurally identical to the above-described first maglev bearing 3 and second maglev bearing 6. That is, the third maglev bearing 85 also includes a third stator 851 and a third rotor, the third stator 851 has a cylindrical body and a number of ninth magnets 8A are arranged along its inner circumference. The third stator 851 is fixed to the casing 1 by, for example, a side rack (not numbered). The third rotor includes a number of tenth magnets 8B arranged around an outer circumference of the axle 81 and surrounded by the ninth magnets 8A. The ninth magnets 8A and the tenth magnets 8B are of a same magnetic polarity. The repulsion between the ninth magnets 8A and the tenth magnets 8B vertically support the axle 81. As such, when the blades 84 are driven to spin by wind, the main axle 5 is engaged to spin as well through the active bevel gear 82 and passive bevel gear 83, causing the generator 4 to produce electricity.

In the above-described power generation process, as the main axle 5 is magnetically levitated by the upper maglev support 7 and the lower maglev support 2 to its top and bottom, and by the first maglev bearing 3 and the second maglev bearing 6 laterally, the main axle 5 suffers no mechanical friction, achieving enhanced power generation efficiency.

Figure 4:
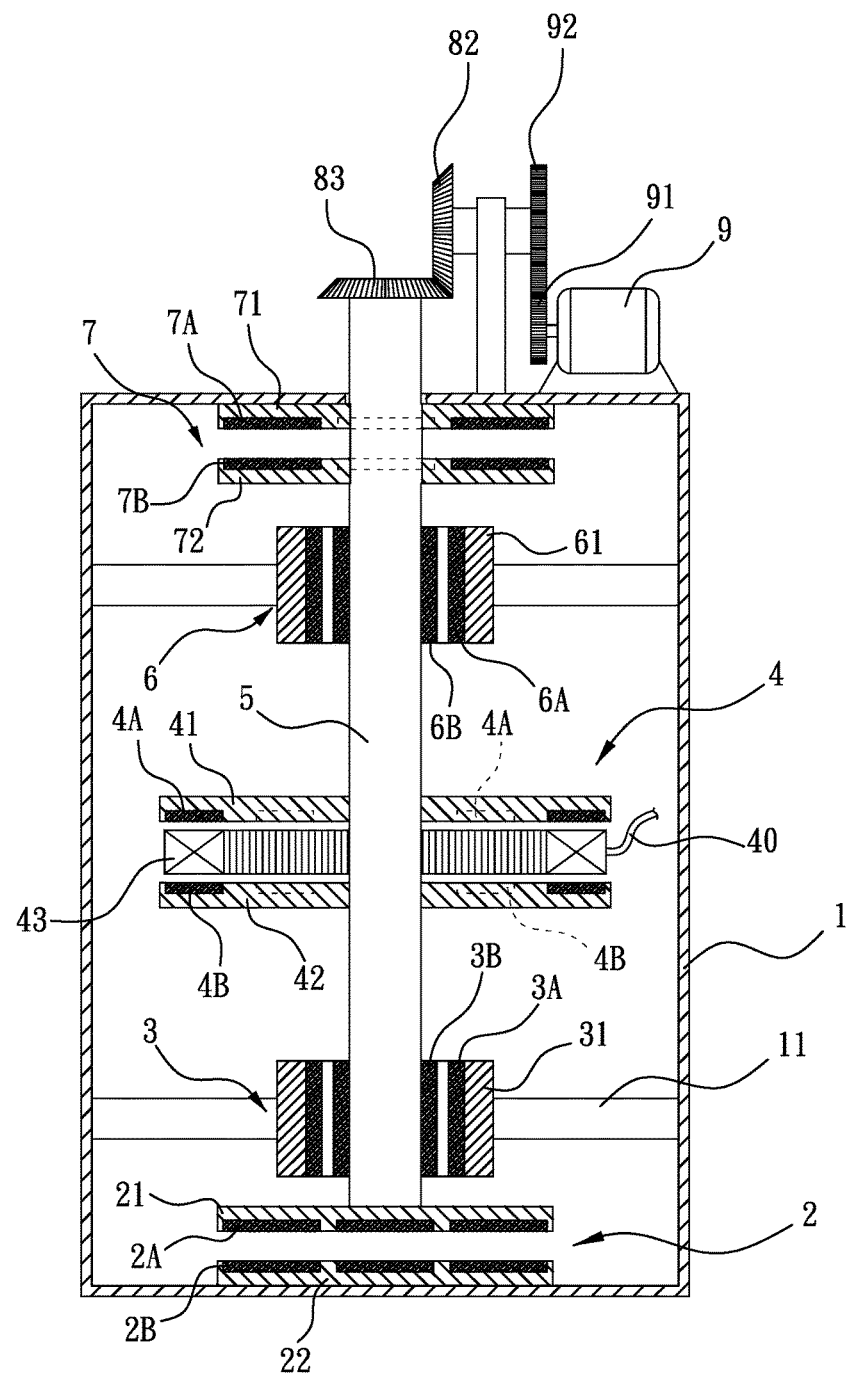
FIG. 4 is schematic sectional diagram showing a maglev generator assembly according to a second embodiment of the present invention.

As shown in FIG. 4, a second embodiment of the present invention teaches a maglev generator assembly similar to the previous embodiment, except that the fan unit 8 is replaced by a motor 9 and a transmission mechanism. For simplicity's sake, description to the components identical to those of the previous embodiment is omitted. The small-power motor 9 is mounted to the casing 1, whose axle (not numbered) is connected to a driving gear 91. The transmission mechanism includes an idle gear 92 and the active bevel gear 82. The idle gear 92 is coupled to the driving gear 91, and the active bevel gear 82 is coupled to the passive bevel gear 83 at the top end of the main axle 5. A part of the power transmission cable 40 is electrically connected to the motor 9. In the present embodiment, a small power is first introduced to start the motor 9. The main axle 5 is then driven to spin by the motor 9 through the driving gear 91, the active bevel gear 82, and the passive bevel gear 83. Then, a portion of the electricity produced by the generator 4 is fed back to the motor 9 to achieve high efficiency.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A wind-powered maglev generator assembly, comprising:
   a hollow casing, the hollow casing comprising a bottom inner wall, a top inner wall, and opposing side walls;
   a lower magnetic repulsion support on the bottom inner wall of the casing;
   an upper magnetic repulsion support on the top inner wall of the casing;
   a plurality of magnetic bearings positioned inside the casing between the lower support and the upper support, each magnetic bearing connected to the opposing side walls by a rack assembly;
   a main axle running vertically through the magnetic bearings, where a bottom end of the main axle is joined to the lower support and a top end of the main axle extends outside the casing through the upper support;
   a generator comprising a stator and a rotor, the stator comprising a plurality of coils, the rotor comprising at least one rotating disc, the disc having an inner side facing the stator coils,
   wherein the coils are fixedly surrounding the main axle and connected to a power transmission cable, the at least one rotating disc is fixed to the main axle, and a plurality of inductive magnets are arranged on the inner side of the at least one rotating disc and mounted opposite to the coils; and
   a fan unit mounted on an outer side of the casing and coupled to the main axle;
   wherein, when the fan unit spins due to an oncoming wind flow, the main axle is driven by the fan unit to spin, and the at least one rotating disc of the generator rotates relative to the coils; and electrical current is induced in the coils and output from the transmission cable; and
   wherein:
   the lower support comprises a circular lower rotating disc and a circular lower fixed disc; the lower rotating disc comprises a plurality of first magnets; the circular lower fixed disc comprises a plurality of second magnets; the first magnets are arranged on a lower side of the circular lower rotating disc and mounted around a center of the circular lower rotating disc; a center of an upper side of the circular lower rotating disc is fixed to a lower end of the main axle; the second magnets are arranged on an upper side of the circular lower fixed disc and mounted around a center of the lower fixed disc; the circular lower fixed disc is fixed to a lower inner wall of the casing and mounted opposite to the circular lower rotating disc;
   the upper support comprises a circular upper fixed disc and a circular upper rotating disc; the circular upper fixed disc comprises a plurality of third magnets and the circular upper rotating disc comprises a plurality of fourth magnets; the third magnets are arranged on a lower side of the circular upper fixed disc and mounted around a center of the circular upper fixed disc; the fourth magnets are arranged on an upper side of the circular upper rotating disc and mounted around a center of the upper rotating disc; an upper side of the circular upper fixed disc is fixed to an upper inner wall of the casing; the circular upper rotating disc is fixed to the main axle and mounted opposite to the circular upper fixed disc; and
   the first magnets and the second magnets are of a same magnetic polarity; the third magnets and the fourth magnets are of a same magnetic polarity; and, due to repulsion between the first and second magnets, and repulsion between the third and fourth magnets, the upper rotating and fixed discs do not contact each other and the lower rotating and fixed discs do not contact each other.

2. The maglev generator assembly according to claim 1, wherein:
   each one of the plurality of magnetic bearings comprises a bearing stator and a bearing rotor;
   the bearing rotor comprises a plurality of sixth magnets arranged around an outer circumference of the main axle;
   the bearing stator has a cylindrical body and comprises a plurality of fifth magnets arranged along an inner circumference of the bearing stator;
   the bearing stator is fixed to the casing;
   the sixth magnets are surrounded by the fifth magnets; and
   the fifth magnets and the sixth magnets are of a same magnetic polarity so that, due to repulsion between the fifth magnets and the sixth magnets, the main axle and the bearing stator do not contact each other.

3. The maglev generator assembly according to claim 2, wherein the generator comprises two rotating discs, both fixedly joined to the main axle; and the two rotating discs are positioned symmetrically above and below the coils.

4. The maglev generator assembly according to claim 3, wherein the fan unit comprises:
   an axle comprising a first end and a second end,
   a plurality of blades fanned out from the axle at the first end of the axle,
   a driving bevel gear fixed to the second end of the axle, and
   a driven bevel gear fixed to the top end of the main axle, the driven bevel gear coupled to and driven by the driving bevel gear.

* * * * *